United States Patent
Rensin et al.

(10) Patent No.: US 7,277,923 B2
(45) Date of Patent: Oct. 2, 2007

(54) SYSTEMS AND METHODS FOR AUTOMATICALLY ACCESSING INTERNET INFORMATION FROM A LOCAL APPLICATION ON A HANDHELD INTERNET APPLIANCE

(75) Inventors: David K. Rensin, Tiburon, CA (US); John Miniati, Menlo Park, CA (US); George Williams, Palo Alto, CA (US); Joshua Flank, Santa Clara, CA (US)

(73) Assignee: Earthlink, Inc., Atlanta, GA (US)

( * ) Notice: Subject to any disclaimer, the term of this patent is extended or adjusted under 35 U.S.C. 154(b) by 895 days.

(21) Appl. No.: 09/834,376

(22) Filed: Apr. 13, 2001

(65) Prior Publication Data
US 2002/0165932 A1    Nov. 7, 2002

(51) Int. Cl.
*G06F 15/16* (2006.01)
(52) U.S. Cl. .................... 709/217; 709/203
(58) Field of Classification Search ............. 709/203, 709/217, 219, 223, 225; 707/6, 10, 102; 715/781
See application file for complete search history.

(56) References Cited

U.S. PATENT DOCUMENTS

| | | | |
|---|---|---|---|
| 5,727,159 A | | 3/1998 | Kikinis |
| 5,857,201 A | | 1/1999 | O'Grady et al. |
| 6,069,628 A | * | 5/2000 | Farry et al. .................. 715/835 |
| 6,088,700 A | * | 7/2000 | Larsen et al. .................. 707/10 |
| 6,199,079 B1 | * | 3/2001 | Gupta et al. .................... 707/6 |
| 6,311,058 B1 | * | 10/2001 | Wecker et al. .............. 455/418 |
| 6,339,780 B1 | * | 1/2002 | Shell et al. .................. 707/102 |
| 6,397,264 B1 | * | 5/2002 | Stasnick et al. ............ 719/328 |
| 6,463,304 B2 | * | 10/2002 | Smethers .................... 455/566 |
| 6,489,975 B1 | * | 12/2002 | Patil et al. ................... 715/781 |
| 6,490,601 B1 | * | 12/2002 | Markus et al. .............. 709/219 |
| 6,535,880 B1 | * | 3/2003 | Musgrove et al. ............ 707/10 |
| 6,553,412 B1 | * | 4/2003 | Kloba et al. ................. 709/219 |
| 6,691,111 B2 | * | 2/2004 | Lazaridis et al. .............. 707/6 |
| 6,823,373 B1 | * | 11/2004 | Pancha et al. .............. 709/219 |

(Continued)

FOREIGN PATENT DOCUMENTS

EP    1 061 440 A    12/2000

(Continued)

OTHER PUBLICATIONS

OmniSky Announces Release 2.0, Business Wire, Oct. 16, 2000, http://www.findarticles.com/p/articles/mi_m0EIN/is_2000_Oct_16/ai_66096479.*

(Continued)

*Primary Examiner*—Moustafa M. Meky
(74) *Attorney, Agent, or Firm*—Smith Frohwein Tempel Greenlee Blaha, LLC; Gregory Scott Smith

(57) ABSTRACT

Systems and methods for automatically accessing Internet information and local applications from another local application on a handheld Internet appliance is provided. The systems and methods of the present invention consist of a software solution that enables users of handheld Internet appliances to interact with the Internet and other local applications from any local application in the handheld Internet appliance. Each local application is equipped with a user interface to enable users quick and easy access to Internet information and other local applications.

17 Claims, 4 Drawing Sheets

U.S. PATENT DOCUMENTS

| | | | |
|---|---|---|---|
| 2001/0054087 A1* | 12/2001 | Flom et al. | 709/218 |
| 2002/0002453 A1* | 1/2002 | Lazaridis et al. | 704/9 |
| 2002/0010850 A1* | 1/2002 | Nelson et al. | 712/202 |
| 2002/0063678 A1* | 5/2002 | Wong | 345/156 |
| 2002/0077156 A1* | 6/2002 | Smethers | 455/566 |
| 2002/0087628 A1* | 7/2002 | Rouse et al. | 709/203 |
| 2002/0107755 A1* | 8/2002 | Steed et al. | 705/26 |

FOREIGN PATENT DOCUMENTS

| | | |
|---|---|---|
| WO | WO98/43177 A | 10/1998 |
| WO | WO99/46701 | 9/1999 |
| WO | WO 00/73921 | 12/2000 |

OTHER PUBLICATIONS

Omnisky licenses handspring blazer browser technology for faster web browsing of more websites, Business wire, Apr. 12, 2001.*

Wireless Internet service and handheld device let users make holiday travel plans on the go, PR Newswire, Dec. 7, 2000.*

Robust demand drives strong Q3 results for Omnisky, Business wire, Nov. 1, 2000.*

Yodlee.com selected by Omnisky to bring next generation personalization services to palm V users, Business wire, May 3, 2000.*

Varhof, P., "Windows CE Ushers in Handheld PCs," *Computer Design* vol. 36 No. 2: pp. 18-22 (Feb. 1, 1997).

Gessler et al., "PDAs as Mobile WWW Browsers," *Computer Networks and ISDN Systems* vol. 28 No. 1: pp. 53-59 (Dec. 1, 1995).

Martin, et al., "The Privacy Practices of Web Browser Extensions," *Communications of the ACM* vol. 44 No. 2: pp. 45-50 (Feb. 2001).

"Helpful Facts About Personal Digital Assistants," Hewlett-Packard Company brochure, http://www.hp.com/hpinfo/newsroom/press/pdabrochure.htm, Dec. 2000.

"Thinmodem™," Card Acess, Inc., web page, http://www.cardaccess-inc.com/thinmodem.html, Date Unknown.

"Handheld Modems," Novatel Wireless, Inc., web page, http://www.novatel.wireless.com/palmtop/index.html, Date Unknown.

"Minstrel V," Novatel Wireless, Inc., web page, http://www.novatelwireless.com/palmtop/minstrel5.html, Date Unknown.

"Palm Vx: Organize More, In Style," Palm Vx Datasheet, Palm Computing, Inc., Date Unknown.

"Palm VII: Wireless Internet Access Comes to the Palm Computing Platform," Palm VII White Paper, Palm Computing, Inc., Nov. 1998.

"Visor Handhelds: Visor Deluxe Details," Handspring, Inc., web page, http://www.handspring.com/products/visordeluxe, Date Unknown.

"Visor Handhelds: Visor Deluxe Solutions," Handspring, Inc., web page, http://www.handspring.com/products/visordeluxe, Date Unknown.

"Visor Handhelds: Visor Platinum Details," Handspring, Inc., web page, http://www.handpsring.com/products/visorplatinum, Date Unknown.

"Visor Handhelds: Visor Platinum Solutions," Handpsring, Inc., web page, http://www.handpsring.com/products/visorplatinum, Date Unknown.

"HP Jornada 520 Series Overview & Features," Hewlett-Packard Company web page, http://www.hp.com/jornada/products/520/overview.html, Date Unknown.

"Samsung Launches PDA Phone," Telecommunications News, Samsung Electronics Co., Ltd., web page, Dec. 20, 2000.

"PDA Phone: PDA and Mobile Phone," CeBIT2001 Trade Show, Samsung Electronics Co., Ltd., web page, Mar. 2001.

W. Mossberg, "Wireless Phone and Palm Are United in Smartphone," The Wall Street Journal, Personal Technology Section, Mar. 8, 2001.

"Kyocera's Smartphone Series," QCP3065 Datasheet, Kyocera Wireless Corp., 2001.

* cited by examiner

```
                           36
                            ↖
    ┌─────────────────────────────────────────────────────────────┐
    │              http://www.vicinity.com/omniblastpqa/           │
    │ startdd.mb?DAD2=^Address&DAD3=^City%2c+^State++^ZipCode&     │
    │              DCITYST=^City%2c+^State                         │
    └─────────────────────────────────────────────────────────────┘
                    ╲37a        ╲37b      ╲37c      ╲37d
```

SYSTEMS AND METHODS FOR AUTOMATICALLY ACCESSING INTERNET INFORMATION FROM A LOCAL APPLICATION ON A HANDHELD INTERNET APPLIANCE

FIELD OF THE INVENTION

This invention relates generally to systems and methods for providing access to Internet information using a handheld Internet appliance. More specifically, the present invention provides systems and methods for accessing Internet information from a local application on a handheld Internet appliance.

BACKGROUND OF THE INVENTION

The Internet and the World Wide Web (hereinafter "the web") have revolutionized the ways in which information is disseminated and shared. At any given time, the Internet enables millions of users worldwide to simultaneously access a wide variety of information and engage in activities as diverse as shopping, playing games, financial trading, among others.

At present, users can access Internet information through various "Internet appliances", which are electronic devices configured with an Internet access system. Internet appliances include, but are not limited to, microprocessor based devices such as personal and portable computers, and handheld appliances such as personal digital assistants and electronic organizers.

Typically, the information is accessed through a connection to a "web page", a multimedia composition that may contain text, audio, graphics, imagery, video, and nearly any other type of content that may be experienced through use of a computer or other electronic device. A web page may also be interactive, and contain user selectable links that cause other web pages to be displayed, forms that may be used by the user to submit information requested in the web page, interactive executable code, or other elements through which the user may interact with web pages. A group of one or more interconnected and closely related web pages is referred to as a "web site".

A web site has a particular address associated with it called a Uniform Resource Locator ("URL"). To view a particular web site, users input its corresponding URL on a "web browser window" displayed by "web browser software", such as Internet Explorer, available from Microsoft Corporation, of Redmond, Wash. The web browser software runs on the user's Internet appliance and is responsible for fetching the information displayed on the web site from a "web server" using a transfer protocol such as the HyperText Transfer Protocol ("HTTP").

While most of the traffic on the Internet is initiated from personal computers, the growing demand by mobile business users to have access to Internet information from anywhere in the world has led to development of various Internet access technologies for handheld Internet appliances such as wireless telephones and personal digital assistants ("PDAs"). In particular, it has become increasingly popular to access information available in the Internet via PDAs, such as the Palm handheld devices manufactured by Palm, Inc., of Santa Clara, Calif., the Handspring Visor manufactured by Handspring, Inc., of Mountain View, Calif., and the HP Jornada manufactured by the Hewlett-Packard Company of Palo Alto, Calif.

A PDA provides computing and information storage and retrieval capabilities for personal or business use, often for keeping schedule calendars and address book information handy. Information is accessed by means of an electronically sensitive pad on which handwriting can be received. Currently available PDAs contain a number of useful local applications including an address book, a calendar, a memo pad, a calculator, and a to-do list, among others. Users are provided with a special pen called a stylus to write on the pad and "tap" on icons on the PDA screen corresponding to the PDA applications. In addition, PDA expansion slots may be used to enhance the PDA capabilities with a digital camera, a GPS receiver, a scanner, and other devices. Recently developed PDAs such as the PDA Phone manufactured by Samsung Electronics, Co., Ltd., of Seoul, South Korea, and the Kyocera QCP 6035 Smartphone manufactured by Kyocera Wireless Corp., of San Diego, Calif., combine the functionalities of a PDA and a wireless phone into a single handheld appliance.

The Internet is accessed on a PDA by means of a wireless modem and Internet access software. The wireless modem may either be internally integrated into the PDA such as in the case of the Palm VIIx, manufactured by Palm, Inc., or connected externally as an expansion module. External wireless modems include the Thinmodem manufactured by Card Access, Inc., of American Fork, Utah, and the various modems manufactured by Novatel Wireless, Inc., of San Diego, Calif. The Internet access software may consist of a microbrowser, which is a simpler version of a web browser with reduced graphic capabilities, and a variety of APIs (application program interfaces) and associated applications for formatting and displaying web pages on the PDA screen.

There are many advantages in being able to access the Internet with a PDA. The PDA is extremely mobile and can be utilized by business persons and consumers who are traveling or otherwise do not have access to a desktop computer. The PDA enables business persons and consumers to manage, share, and secure the information needed on a daily basis. A PDA user can access the Internet to read e-mails, search for a restaurant, obtain a map and driving directions, purchase airline tickets or shop, all without the need for a traditional, desktop computer.

However, accessing the Internet using a PDA has several drawbacks. First, it can be a very time consuming process, requiring users to work through many options in order to access the desired information. Many "taps" may be needed in order to browse the web and view other information stored in the PDA. Second, the wireless Internet connection may be unreliable, and the user may have to wait a significant amount of time to receive the requested information. Lastly, it can be extremely cumbersome for the user to access Internet information from local PDA applications.

For instance, a user who wants to obtain driving directions to or from a given address saved in the PDA's address book is required to perform a number of steps, including: (1) starting the address book application to get the address; (2) quitting the address book application; (3) connecting to the web site that provides driving directions; (4) and manually entering the address into an on-line form available in the web site.

In order to make travel arrangements for meetings listed on the PDA's calendar, the user must first quit the calendar application before connecting to a web site for making travel reservations, and then manually enter the departure date, time, location and destination, as well as a return date and time. Similarly, a user who is using the PDA's address book to find an e-mail address before sending an e-mail must first get the e-mail address in the address book and quit the address book application before starting the e-mail application and manually entering the e-mail address in the address field of the e-mail. In short, it can be inordinately difficult and time consuming for the PDA user to access Internet information from local PDA applications.

In view of the foregoing drawbacks, it would be desirable to provide systems and methods for automatically accessing Internet information from a local application on a handheld Internet appliance.

It further would be desirable to provide systems and methods for accessing Internet information associated with a data record of a local application on a handheld Internet appliance.

It still further would be desirable to provide systems and methods for automatically launching e-mail and Internet web sites from a local application on a handheld Internet appliance.

It also would be desirable to provide systems and methods for automatically launching a local application from another local application on a handheld Internet appliance.

SUMMARY OF THE INVENTION

In view of the foregoing, it is an object of the present invention to provide methods and apparatus for automatically accessing Internet information from a local application on a handheld Internet appliance.

It is another object of the present invention to provide systems and methods for accessing Internet information associated with a data record of a local application on a handheld Internet appliance.

It is a further object of the present invention to provide systems and methods for automatically launching e-mail and Internet web sites from a local application on a handheld Internet appliance.

It is also an object of the present invention to provide systems and methods for automatically launching a local application from another local application on a handheld Internet appliance.

These and other objects of the present invention are accomplished by providing systems and methods for automatically accessing Internet information from a local application on a handheld Internet appliance. A local application consists of any software application used in handheld Internet appliance 20, such as personal information manager (PIM) applications including an address book, a calendar, a memo pad, a calculator, and a to-do list, a web browser application, a word processing application, a spreadsheet application, among others. The systems and methods consist of a software solution that enables users of handheld Internet appliances to enhance local applications with Internet capabilities. Each local application is equipped with an action user interface that lets users access Internet information with a single tap.

In a preferred embodiment, the systems and methods of the present invention involve three main software components: (1) a software plug-in; (2) an action user interface; and (3) an action database. The software plug-in enables users of a handheld Internet appliance to have access to a number of Internet actions associated with a local application. The Internet actions are accessed by means of a customizable action user interface that is unique to each local application. An action database stores the information required to create the items in the user interface and their links to web sites and other local applications.

Advantageously, the present invention enables users to automatically launch e-mail and web sites from a local application as well as automatically launch local applications from other local applications.

In addition, the present invention enables users to access Internet information associated with a data record of a local application.

BRIEF DESCRIPTION OF THE DRAWINGS

The foregoing and other objects of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
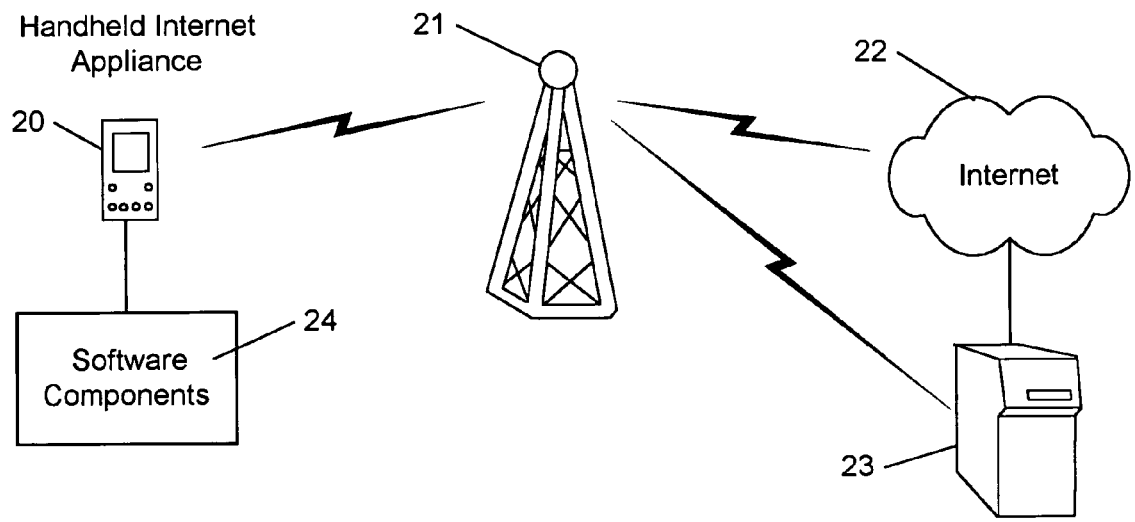
FIG. 1 is a schematic view of the system and the network environment in which the present invention operates.

Referring to FIG. 1, a schematic view of the system and the network environment in which the present invention operates is described. Handheld Internet appliance 20 uses a wireless modem and Internet access software to connect to Internet 22 by means of a wireless network represented by base station 21. Handheld Internet appliance 20 may consist of a personal digital assistant (PDA) such as the Palm handheld devices manufactured by Palm, Inc., of Santa Clara, Calif., the Handspring Visor manufactured by Handspring, Inc., of Mountain View, Calif., and the HP Jornada manufactured by the Hewlett-Packard Company of Palo Alto, Calif. Handheld Internet appliance 20 may also consist of appliances having the functions of a PDA and a cellular phone, such as the PDA Phone manufactured by Samsung Electronics, Co., Ltd., of Seoul, South Korea, and the Kyocera QCP 6035 Smartphone manufactured by Kyocera Wireless Corp., of San Diego, Calif.

Handheld Internet appliance 20 has an electronically sensitive pad and screen on which handwriting can be received and visualized. Handheld Internet appliance 20 typically contains a number of useful local applications, which consist of any software application used in handheld Internet appliance 20, such as PIM applications including an address book, a calendar, a memo pad, a calculator, and a to-do list, a web browser application, a word processing application, a spreadsheet application, among others. Additional software applications such as games, spreadsheet programs, document processors, dictionaries, and others, may be easily added to handheld Internet appliance 20. Users are provided with a special pen called a stylus to write on the pad and "tap" on icons on the screen corresponding to the available applications. Handheld Internet appliance 20 has a main menu to display the application icons to the user. In addition, expansion slots may be used to enhance the capabilities of handheld Internet appliance 20 with a digital camera, a GPS receiver, a scanner, and other devices.

To protect the data saved in handheld Internet appliance 20, a synchronization technology may be used to synchronize the data from handheld Internet appliance 20 to a personal computer. Like a personal computer, handheld Internet appliance 20 has an operating system to manage its applications, input and output functions and devices, memory sharing, among other functions. Examples of currently available operating systems for handheld Internet appliance 20 include the Palm OS, developed by Palm, Inc., and the Windows CE, developed by Microsoft Corporation, of Redmond, Wash.

Handheld Internet appliance 20 connects to Internet 22 by means of a wireless modem. The wireless modem may be internally integrated into handheld Internet appliance 20 such as in the case of the Palm VIIx, manufactured by Palm, Inc., or connected externally as an expansion module. External wireless modems include the Thinmodem manufactured by Card Access, Inc., of American Fork, Utah, and the various modems manufactured by Novatel Wireless, Inc., of San Diego, Calif. In addition to the wireless modem, handheld Internet appliance 20 requires Internet access software to enable users to connect to the Internet. The Internet access software may consist of a microbrowser, which is a simpler version of a web browser with reduced graphic capabilities, and a variety of APIs (application program interfaces) and associated applications for formatting and displaying web pages on the PDA screen.

Users of handheld Internet appliance 20 connect to Internet 22 to access e-mail and various web pages that are formatted for proper display on the screen of handheld Internet appliance 20. The web pages may be formatted in advance for a specific handheld Internet appliance 20 at the web server associated with the web site containing the web pages. Alternatively, the web sites may be formatted at transcoding server 23. Transcoding server 23 is a server that formats web pages for display by handheld Internet appliance 20. Transcoding server 23 may also add to the web pages user interfaces and links to local applications on handheld Internet appliance 20.

In accord with one embodiment of the present invention, handheld Internet appliance 20 has software components 24 to enable users to access Internet information from local applications. Software components 24 enable users to automatically launch e-mail and web sites from a local application as well as automatically launch local applications from another local application. For example, users of handheld Internet appliance 20 may launch the address book application from the calendar application. In addition, software components 24 enable users to access Internet information associated with a data record of a local application. For example, a user can request driving directions to an address record saved in the address book application, make travel reservations for a meeting scheduled on the calendar application, send an e-mail to a friend from the address book application, check financial information for a stock noted in the memo pad, among others. Software components 24 consist of software routines or objects that perform various functions and may be used alone or in combination with other components. In a preferred embodiment, software components 24 consist of a software plug-in, an action user interface, and an action database.

Figure 2:
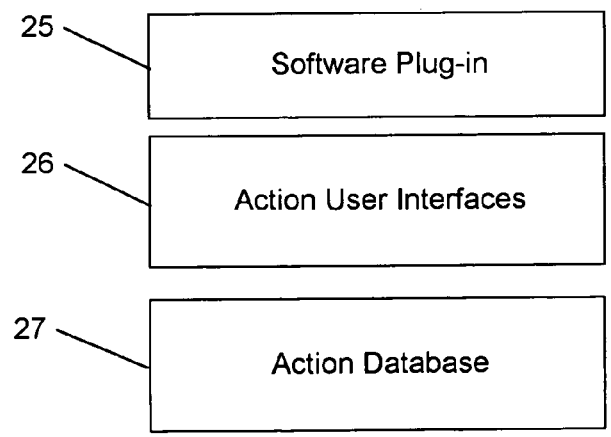
FIG. 2 is a schematic view of a preferred embodiment of the software components of the present invention.

Referring now to FIG. 2, a schematic view of a referred embodiment of the software components of the resent invention is described. Software components consist of: (1) software plug-in 25; (2) action user interfaces 26; and (3) action database 27.

Software plug-in 25 enables users to have access to a number of Internet actions associated with a local application on handheld Internet appliance 20. Software plug-in 25 performs a variety of functions, including: (1) launching other local applications such as e-mail from a local application; (2) accessing web sites from a local application; (3) creating items for action user interfaces 26 including their links to web sites and other local applications based on the information stored in action database 27; and (4) replacing parameters associated with a data record on a web site's URL when the web site is requested to display information associated with the data record. In this case, the data record may be stored in a local database associated with a local application, or the data record may be displayed on another web site. Software plug-in 25 is also responsible for keeping the action items stored in action database 27 current.

In the preferred embodiment, software plug-in 25 also enables a user to automatically save items from a web site into a local PIM application as described in copending, U.S. application Ser. No. 09/834,380, filed on Apr. 13, 2001 and conversely, automatically fill the web sites' on-line forms with data records from a local PIM application as described in copending, U.S. application Ser. No. 09/834,379 filed on Apr. 13, 2001.

In a preferred embodiment, the web site API is referred to as the OneTap™ API, the software plug-in is referred to as the OneTap™ software plug-in, the user interface is referred to as the OneTap™ user interface, the favorites database is referred to as the OneTap™ favorites database, and the database browser is referred to as the OneTap™ database browser.

Action user interfaces 26 consist of a set of user interfaces, with each user interface optimized for a given local application. Each user interface of action user interfaces 26 is displayed to the user as a "button" or icon that may be tapped by the user with a stylus. Once tapped, the button displays an action menu containing items that may be performed by the user from the local application. Such items include launching other local applications, launching web sites, returning to the main menu, disconnecting from the Internet, among others. Action database 27 stores the information required to create the items in the action menus of action user interfaces 26.

Figure 3:
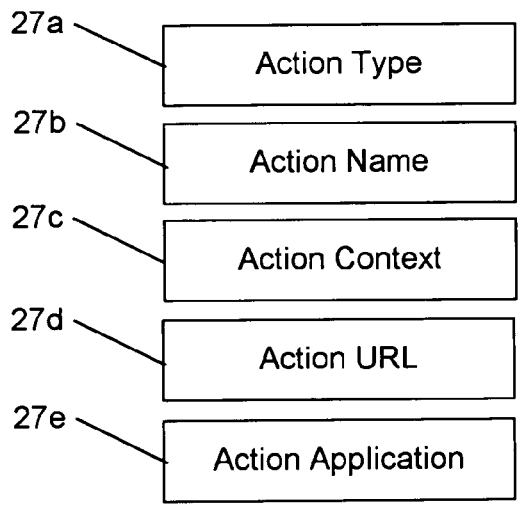
FIG. 3 is a schematic view of the action database in accordance with the principles of the present invention.

Referring now to FIG. 3, a schematic view of the action database in accordance with the principles of the present invention is described. Action database 27 contains fields 27*a-e* in its columns. Each row of action database 27 contains a unique record or instance of data for fields 27*a-e*.

Action Type field 27*a* stores the type of action that may be performed by an user from a local application. The types of action include launching another local application, launching a web site, returning to the main menu of handheld Internet appliance 20, disconnecting from the Internet, among others. Action name field 27*b* stores the name of an action that may be performed by the user. The actions performed vary according to the local application.

Action Context field 27*c* stores the list of contexts or local applications in which a particular action appears. In case the action consists of launching a web site, Action URL field 27*d* stores the URL and its associated parameters. The associated parameters are extracted from a given data record of the local application from which the web site is launched. For instance, for a web site providing maps and driving directions, the URL parameters consist of an address record saved in the address book of handheld Internet appliance 20.

In case the action consists of launching an application, Action application field 27*e* stores the name of the local application to be launched.

Figure 4:
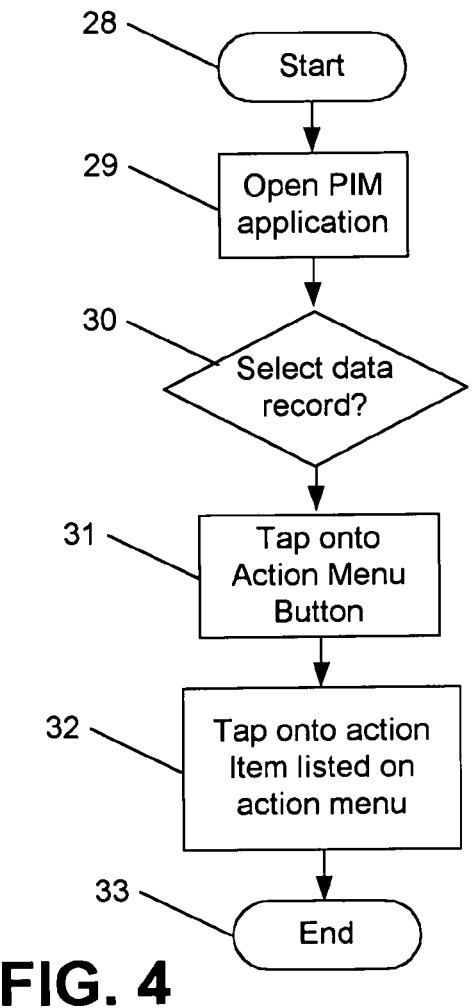
FIG. 4 is a flowchart for using the systems and methods of the present invention to launch a web site or a local application from another local application.

Referring now to FIG. 4, a flowchart for using the systems and methods of the present invention to launch a web site or a local application from another local application is described. At step 29, the user opens a local application by tapping on the icon corresponding to the local application on the main menu of handheld Internet appliance 20. At step 30, the user has an option to select a data record saved in the local application to access Internet information associated with the data record. For example, if the user is using the address book application, the user may select an address saved in the address book to get driving directions to the address.

At step 31, the user taps onto the action menu button to open the action menu that lists the actions that may be performed by software plug-in 25 from the local application. The actions performed include launching other local applications, launching web sites, returning to the main menu, disconnecting from the Internet, among others.

At step 32, the user selects the action to be performed by software plug-in 25. At this step, in case the user requests to launch a web site to access information for a given data record of the local application, software plug-in 25 retrieves the parameters associated with the data record to include in the URL to be opened. For example, if the user is using the address book application to get driving directions to a given address, software plug-in 25 inserts the address in the URL for the appropriate web query.

Figure 5:
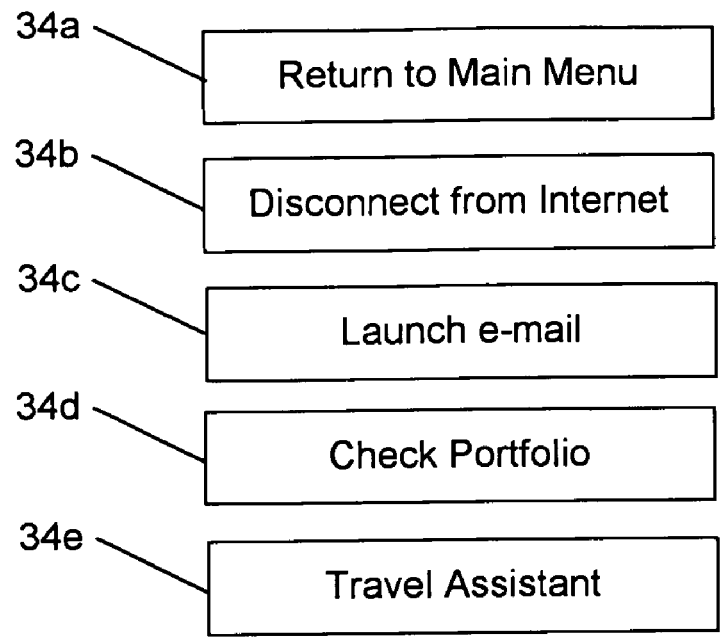
FIG. 5 is an illustrative view of action menu items accessible from any local application.

Referring now to FIG. 5, an illustrative view of action menu items accessible from any local application is described. Action menu item 34*a* enables the user to return to the main menu of handheld Internet appliance 20 from any local application, while action menu item 34*b* enables the user to disconnect from the Internet. Action item 34*c* launches the e-mail application from any local application. Action item 34*d* launches a financial web site to display the user's financial portfolio, and action item 34*e* launches a travel web site that allows the user to check and make travel reservations.

In a preferred embodiment, when the user selects action item 34*c* to launch the e-mail application, software plug-in 25 automatically inserts a selected address in the "Send To" e-mail field. Similarly, when the user selects action item 34*e* to make travel reservations, software plug-in 25 may automatically fill in the dates, times, and travel departure and destination information.

Figure 6:
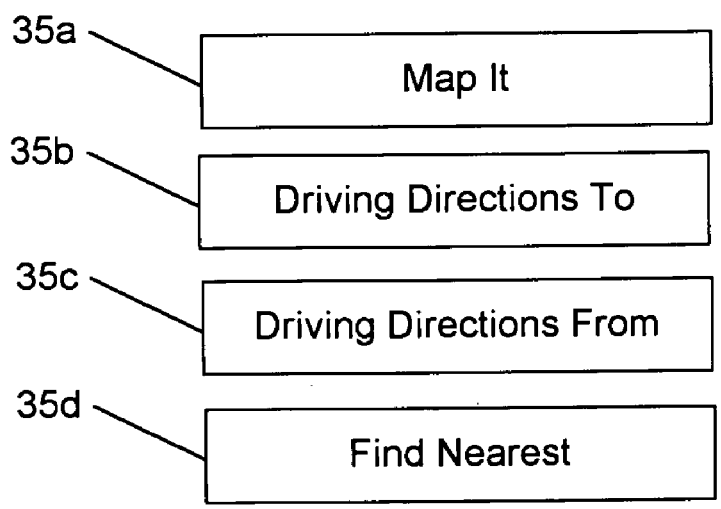
FIG. 6 is an illustrative view of action menu items accessible from the address book application.

Referring now to FIG. 6, an illustrative view of action menu items accessible from the address book application is described. Action menu items 35*a*-*d* may be selected from the address book application in addition to the action menu items shown in FIG. 5. Action menu item 35*a* launches a web site to display a map of the region near a selected address saved in the address book. Action menu item 35*b* launches a web site to give driving directions to a selected address saved in the address book, while action menu item 35*c* launches a web site to give driving directions from a selected address saved in the address book. In the case of action menu item 35*b*, the user needs to enter the starting address in an on-line form provided in the web site, while in the case of action menu item 35*c*, the user needs to enter the destination address in the on-line form. Alternatively, the user may select another address in the address book to be automatically entered in the on-line form as the starting or destination address.

Finally, action menu item 35*d* enables the user to find a shop specialized in a given category that is near a selected address saved in the address book. For example, the user may select action menu item 35*d* to find the nearest restaurants or coffee shops to an address saved in the address book.

Figures 7, 8:
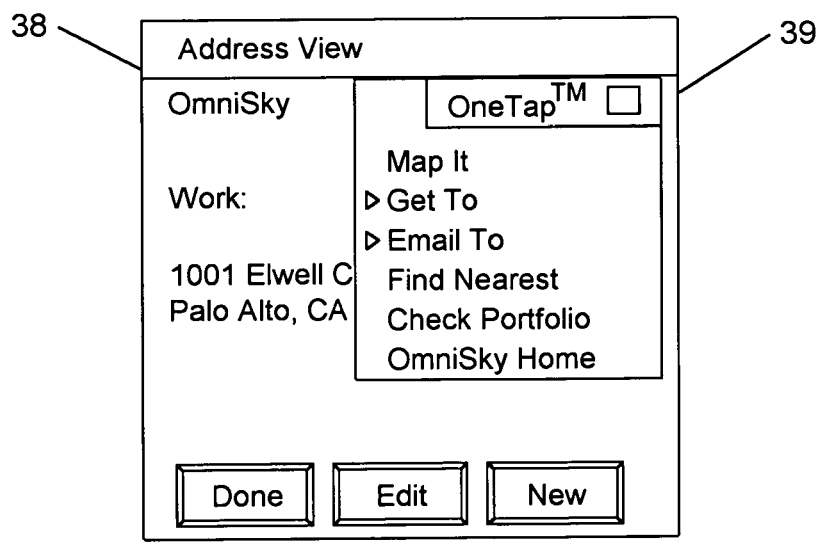
FIG. 7 is an exemplary URL and associated parameters launched from the address book application to find driving directions to a selected address saved in the address book.
FIG. 8 is an illustrative of a handheld Internet appliance screen displaying an address stored in the address book and an action user interface for allowing the user to launch e-mail and web sites displaying information associated with the address.

Referring now to FIG. 7, an exemplary URL and associated parameters launched from the address book PIM application to find driving directions to a selected address saved in the address book is described. URL 36 launches the www.vicinity.com web site belonging to Vicinity Corp., of Sunnyvale, Calif., to get driving directions to a selected address saved in the address book. Software plug-in 25 automatically fills in parameters 37*a*-*d* in URL 36 with the street address (37*a*), city (37*b*), state (37*c*), and zip code (37*d*) of the selected address saved in the address book. The driving directions are then displayed on the screen of handheld Internet appliance 20.

Referring now to FIG. 8, an illustrative view of a handheld Internet appliance screen displaying an address stored in the address book and an action user interface for allowing the user to launch e-mail and web sites displaying information associated with the address is described. Handheld Internet appliance screen 38 is displaying an address stored in the address book application of the handheld Internet appliance. A user taps onto a button displayed in handheld Internet appliance 38 to display action user interface 39. Action user interface 39 enables the user to launch e-mail and web sites directly from the address book application. The web sites may be used for displaying information associated with the address. User interface 39 also enables the user to return to the main menu of the handheld Internet appliance.

Although particular embodiments of the present invention have been described above in detail, it will be understood that this description is merely for purposes of illustration. Specific features of the invention are shown in some drawings and not in others, and this is for convenience only and any feature may be combined with another in accordance with the invention. Steps of the described processes may be reordered or combined, and other steps may be included. Further variations will be apparent to one skilled in the art in light of this disclosure and are intended to fall within the scope of the appended claims.

What is claimed is:

1. A system for automatically accessing Internet information from a first local application on a handheld Internet appliance, the system comprising:

a software plug-in to automatically launch a second local application from the first local application and to automatically transfer information obtained from a web site and stored in a local database in the handheld Internet appliance to the second local application;

a user interface in the first local application to enable a user to launch the second local application from the first local application, the user interface comprising a button to display a menu with links to the second local application; and the local database programmed to store the information obtained from the web site; wherein the user interface in an address book application comprises links to enable the user to perform a plurality of actions, the plurality of actions comprising: returning to a main menu of the handheld Internet appliance with a single tap on the user interface menu; disconnecting from the Internet with a single tap on the user interface menu; sending an e-mail from the address book application; launching a financial web site with a single tap on the user interface menu; launching a travel web site with a single tap on the user interface menu; mapping an address stored in the address book application; getting driving directions to an address stored in the address book application; getting driving directions from an address stored in the address book application; and finding a commercial location nearest to an address stored in the address book application.

2. The system of claim 1, wherein sending an e-mail from the address book application comprises: selecting a data record stored in the address book application, the data record associated with the e-mail recipient; extracting the name of the e-mail recipient from the data record; and automatically filling the e-mail recipient field with the name of the e-mail recipient extracted from the data record.

3. The system of claim 1, wherein mapping an address stored in the address book application comprises: selecting a data record stored in the address book application, the data record comprising the address to be mapped; launching a web site proving maps of addresses; and automatically filling the web site's URL with the address to be mapped.

4. The system of claim 1, wherein getting driving directions from an address stored in the address book application comprises: selecting a data record stored in the address book application, the data record comprising the address from which driving directions are requested; launching a web site providing driving directions; and automatically filling an on-line form in the web site corresponding to the starting address with the data record.

5. The system of claim 4, further comprising automatically filling an on-line form in the web site corresponding to a destination address with an address selected by the user and stored in the address book application.

6. The system of claim 1, wherein finding a commercial location nearest to an address stored in the address book application comprises: selecting a data record stored in the address book application, the data record comprising the address for which a nearest commercial location is desired; launching a web site providing addresses of commercial locations in a given neighborhood; automatically filling the web site's URL field corresponding to the neighborhood with the data record selected from the address book application.

7. A system for automatically accessing Internet information from a first local application on a handheld Internet appliance, the system comprising:
a software plug-in to automatically launch a second local application and a web site from the first local application;
a user interface in the first local application to enable a user to launch the second local application and the web site from the first local application, the user interface comprising a button to display a menu with links to the second local application and the web site, wherein the user interface in an address book application comprises links to enable the user to perfonn a plurality of actions, the plurality of actions comprising: returning to a main menu of the handheld Internet appliance with a single tap on the user interface menu; disconnecting from the Internet with a single tap on the user interface menu; sending an e-mail from the address book application; launching a financial web site with a single tap on the user interface menu; launching a travel web site with a single tap on the user interface menu; mapping an address stored in the address book application; getting driving directions to an address stored in the address book application; getting driving directions from an address stored in the address book application; and finding a commercial location newest to an address stored in the address book application;
wherein getting driving directions to an address stored in the address book application comprises: selecting a data record stored in the address book application, the data record comprising the address to which driving directions are requested; launching a web site providing driving directions; and automatically filling an on-line form in the web site corresponding to the destination address with the data record and
a database programmed to store the information required to create the links in the user interface.

8. A system for automatically accessing Internet information from a first local application on a handheld Internet appliance, the system comprising:
a software plug-in to automatically launch a second local application and a web site from the first local application;
a user interface in the first local application to enable a user to launch the second local application and the web site from the first local application, the user interface comprising a button to display a menu with links to the second local application and the web site, wherein the user interface in an address book application comprises links to enable the user to perform a plurality of actions, the plurality of actions comprising: returning to a main menu of the handheld Internet appliance with a single tap on the user interface menu; disconnecting from the Internet with a single tap on the user interface menu; sending an e-mail from the address book application; launching a financial web site with a single tap on the user interface menu; launching a travel web site with a single tap on the user interface menu; mapping an address stored in the address book application; getting driving directions to an address stored in the address book application; getting driving directions from an address stored in the address book application; and finding a commercial location nearest to an address stored in the address book application; and
wherein sending an e-mail from the address book application comprises: selecting a data record stored in the address book application, the data record associated with the e-mail recipient; extracting the name of the e-mail recipient from the data record; and automatically filling the e-mail recipient field with the name of the e-mail recipient extracted from the data record; and further comprising automatically filling an on-line form in the web site corresponding to a starting address with an address selected by the user and stored in the address book application; and
a database progranmied to store the information required to create the links in the user interface.

9. A method for automatically launching a plurality of local applications and a plurality of web sites from an already open local application on a handheld Internet appliance, the method comprising:
providing a software plug-in to automatically launch the plurality of local applications and the plurality of web sites from the already open local application and to obtain information required by the plurality of local applications and the plurality of web sites from another web site;

providing a user interface in the already open local application to enable a user to launch the plurality of local applications and the plurality of web sites from the already open local application, the user interface comprising a button to display a menu with links to each of the local applications from the plurality of local applications and each of the web sites from the plurality of web sites; and providing a database programmed to store the information required to create the links in the user interface; and wherein the user interface in an address book application comprises links to enable the user to perform a plurality of actions, the plurality of actions comprising: returning to a main menu of the handheld Internet appliance with a single tap on the user interface menu; disconnecting from the Internet with a single tap on the user interface menu; sending an e-mail from the address book application; launching a financial web site with a single tap on the user interface menu; launching a travel web site with a single tap on the user interface menu; mapping an address stored in the address book application; getting driving directions to an address stored in the address book application; getting driving directions from an address stored in the address book application; and finding a commercial location nearest to an address stored in the address book application.

10. The method of claim 9, wherein sending an e-mail from the address book application comprises: selecting a data record stored in the address book application, the data record associated with the e-mail recipient; extracting the name of the e-mail recipient from the data record; and automatically filling the e-mail recipient field with the name of the e-mail recipient extracted from the data record.

11. The method of claim 9, wherein mapping an address stored in the address book application comprises: selecting a data record stored in the address book application, the data record comprising the address to be mapped; launching a web site proving maps of addresses; and automatically filling the web site's URL with the address to be mapped.

12. The method of claim 9, wherein getting driving directions to an address stored in the address book application comprises: selecting a data record stored in the address book application, the data record comprising the address to which driving directions are requested; launching a web site providing driving directions; and automatically filling an on-line form in the web site corresponding to the destination address with the data record.

13. The method of claim 12, further comprising automatically filling an on-line form in the web site corresponding to a starting address with an address selected by the user and stored in the address book application.

14. The method of claim 9, wherein getting driving directions from an address stored in the address book application comprises: selecting a data record stored in the address book application, the data record comprising the address from which driving directions are requested; launching a web site providing driving directions; and automatically filling an on-line form in the web site corresponding to the starting address with the data record.

15. The method of claim 14, further comprising automatically filling an on-line form in the web site corresponding to a destination address with an address selected by the user and stored in the address book application.

16. The method of claim 9, wherein finding a commercial location nearest to an address stored in the address book application comprises: selecting a data record stored in the address book application, the data record comprising the address for which a nearest commercial location is desired; launching a web site providing addresses of commercial locations in a given neighborhood; automatically filling the web site's URL field corresponding to the neighborhood with the data record selected from the address book application.

17. A handheld Internet appliance for accessing a plurality of local applications and a plurality of web sites, the handheld Internet appliance comprising:

a main menu with buttons for accessing the plurality of local applications;

a wireless modem for connecting to the Internet;

a plurality of software routines for accessing the Internet;

a software plug-in to automatically launch the plurality of local applications and the plurality of web sites from an already launched local application;

a user interface to enable a user to launch the plurality of local applications and the plurality of web sites from the already launched local application, the user interface comprising a button to display a menu with links to each of the local applications from the plurality of local applications and each of the web sites from the plurality of web sites, wherein the user interface in an address book application comprises links to enable the user to perform a plurality of actions, the plurality of actions comprising: returning to a main menu of the handheld Internet appliance with a single tap on the user interface menu; disconnecting from the Internet with a single tap on the user interface menu; sending an e-mail from the address book application; launching a financial web site with a single tap on the user interface menu; launching a travel web site with a single tap on the user interface menu; mapping an address stored in the address book application; getting driving directions to an address stored in the address book application; getting driving directions from an address stored in the address book application; and finding a commercial location nearest to an address stored in the address book application, wherein getting driving directions to an address stored in the address book application comprises: selecting a data record stored in the address book application, the data record comprising the address to which driving directions are requested; launching a web site providing driving directions; and automatically filling an on-line form in the web site corresponding to the destination address with the data record; and a database prograninied to store the information required to create the links in the user interface.

* * * * *